United States Patent Office 3,281,190
Patented Oct. 25, 1966

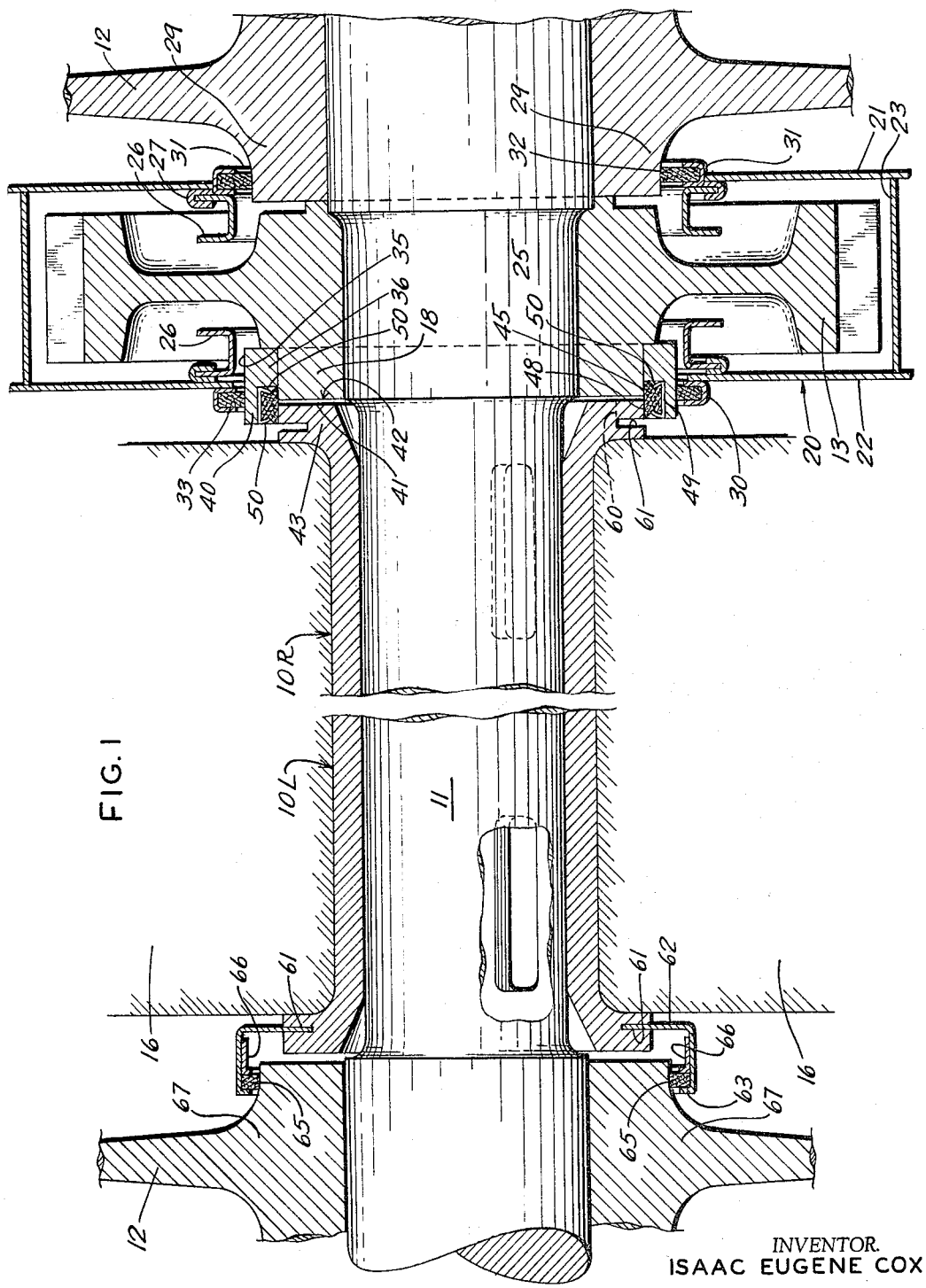

3,281,190
SEALS
Isaac E. Cox, Kirkwood, Mo., assignor to Abex
Corporation, a corporation of Delaware
Filed Aug. 9, 1963, Ser. No. 301,022
5 Claims. (Cl. 308—36.1)

This invention relates to locomotive traction motors and in particular to improvements in the seal elements that are a part of the gear housing associated with the gear on the locomotive drive axle.

The wheels of a diesel locomotive are driven by an axle gear which in turn is driven by a motor powered gear located at what is designated the pinion end of the axle. The axle in turn is rotatably supported in bearings at the opposite ends thereof, and these bearings are lubricated by oil. On the other hand, the axle gear is lubricated by a heavy, viscous grease which, if commingled with the lighter weight lubricating oil for the bearing adjacent the pinion end of the axle, will be deleteriously diluted. Therefore, the driving gear is ordinarily protected against ingress of bearing oil, as well as from dust and dirt and foreign objects, by a stationary gear housing or gear case at the pinion end of the axle.

One way heretofore proposed for preventing the commingling of the light-weight bearing oil with the heavy-weight lubricant for the gear has been to provide oil slinger or throwing ribs on the hub of the gear between the gear and the bearing at the pinion end of the axle. In modern locomotives, there is insufficient space for such slingers, but even so the slingers have been found to be unacceptable in performance at low speeds where the centrifugal force is not sufficient to throw the oil, and hence the oil may flow across the grooves and commingle with the grease in the gear case. The oil slinger ribs, for example, are less effective when the locomotive is moving up an inclined grade at low speeds. Accordingly, it is an object of the present invention to prevent the commingling of the lubricants either at high speeds or at low speeds of the locomotive by resorting to separate and non-connected seals of novel construction for both the bearing and the gear case.

It has been additionally proposed to prevent the commingling of the two lubricants by a seal of felt or the like in engagement with a surface of the gear hub between the pinion end bearing and the gear. However, it has been found that the felt seal arrangement as heretofore afforded is not always effective to prevent seepage therepast. Also, there have been attempts to prevent commingling of the lubricants by providing the gear case with a pair of adjacent seals spaced by an annular cavity in which is located a drain to drain off any seepage past one of the adjacent seals. However, it has been found that the drain often becomes plugged and commingling of lubricant ensues. Accordingly, it is an object of the present invention to prevent the passage of lubricant beneath a single seal or beneath adjacent seals by directing any seepage of lubricants past a seal to a discharge position into the ambient atmosphere.

More specifically, the present invention employs a pair of separate seals, one for the bearing and one for the gear housing which are not in fluid communication with one another, but each of which is in fluid communication with the ambient atmosphere, so that any leakage therepast is discharged into the atmosphere rather than into the opposite lubricant reservoir. Further, under the present invention, it is possible to employ a pair of separate seals in a narrow space, that would normally not permit the use of double seals, by a unique construction wherein one seal is superimposed over another seal.

Other and further objects of the present invention will be apparent from the following description and claims and are illustrated in the accompanying drawing which, by way of illustration, shows a preferred embodiment of the present invention and the principles thereof and what is now considered to be the best mode contemplated for applying these principles. Other embodiments of the present invention embodying the same or equivalent principles may be used and structural changes may be made as desired by those skilled in the art without departing from the present invention and the purview of the appended claims.

In the drawings:

The appended sheet of drawing, FIG. 1, is a sectional view of the drive axle of a locomotive including bearings and a gear case constructed under and in accordance with the present invention.

The support and driving mechanism shown herein is that of a diesel locomotive and for a more complete description and illustration of the bearings 10L and 10R, axle 11, railway wheels 12 and driving gear 13, reference should be had to the co-pending application of I. E. Cox, Serial No. 230,055, filed October 12, 1962 and entitled "Bearings," the disclosure of the co-pending application being incorporated by reference herein and made a part hereof as though fully reproduced herein.

The present sheet of drawing is similar to FIG. 5 of the aforementioned application. The bearings 10L and 10R are of identical construction and are mounted in a bearing housing 16. The bearing housing 16 is part of the conventional motor frame of the locomotive in which is mounted the traction motor that turns a pinion thereon (not shown) to drive the driving gear 13 having a hub 18 that is press-fitted on a corresponding hub seat 25 of the axle 11. Rotation of the driving gear 13 by the traction motor causes rotation of the axle 11 and the wheels 12 secured to the outer ends of the axle 11.

For the purpose of preventing dirt and other foreign material from contaminating the grease carried on the driving gear 13, and for the purpose of serving as a container for the grease for the driving gear 13, a gear case or housing 20 has a pair of spaced annular side walls 21 and 22 and an outer cylindrical cover wall 23 spanning the side walls 21 and 22 and is secured to the frame in a manner not shown. The gear housing 20 has secured on each of the side walls 21 and 22 adjacent the hub 18 of the gear 13 an inwardly directed deflector 26 having a U-shaped or channel-shaped configuration serving as a gear lubricant deflector. The deflectors 26 are secured to the inner walls of the gear housing 20 by annular brackets 27 adapted to receive one side wall of the U-shaped deflectors 26.

The side walls 21 and 22 of the gear case housing 20 have annular openings therein through which project the hub 29 of the wheel 12 and the hub 18 of the gear 13, both of which rotate within the stationary gear housing 20. To seal the interior of the gear housing 20 from dirt and other foreign materials, and to prevent their entrance and contamination of the grease within the gear housing, the side walls 21 and 22 each carry a pair of circular channel members 30 and 31 in which are disposed circular seals 32 and 33 of felt or other suitable material. The seals 32 and 33 extend for 360° about the channels 30 and 31 and are usually formed of abutted 180° semi-circular halves. The outer seal 32 is in engagement with the hub 29 of the right-hand wheel 12 and prevents the entrance of any dirt to the interior of the housing 20 and also prevents the leakage of any grease moving past the deflectors 26 to the surface of the hub 29 of the wheel 12. If any grease seeps or leaks past the seal 32, it will be thrown from the hub 29 as the hub rotates with the wheel 12.

The seal 33 on the inner side wall 22 of the gear housing 20 has the same function and purpose as the seal 32. The seal 33 is in engagement with an outer annular surface 35 of a seal ring or flange means 36 secured to the hub 18 of the gear 13. Thus, the seal 33 fits tightly on the outer surface 35 of the seal ring 36 and prevents the entrance of dirt and other foreign material from the ambient atmosphere to the interior of the gear housing 20 along the surface 35 of the seal ring 36 and also prevents the loss of the grease moving past its associated deflector 26 along the surface 35. However, any grease seeping or leaking past the seal 33 moves along the surface 35 and is thrown from the outer surface 35 into the atmosphere as the seal ring 36 rotates with the gear 13.

The seal ring 36 supports a seal and to this end has an inwardly directed face or lip 40 carrying a seal 45. The seal ring 36 and seal 45 extend outwardly and over the interface between a thrust face 42 of the gear hub on the gear 18 and an opposed thrust surface 41 on a thrust flange 43 integral with the pinion end bearing 10R. Lubricating oil is maintained between the axle 11 and the bearings 10L and 10R and is less viscous than the heavy-weight grease carried within the gear case housing 20. The light-weight oil also tends to move along the interface of the thrust surfaces 41 and 42 to lubricate these thrust surfaces 41 and 42 at their interface.

To prevent the loss of oil from the interface of the thrust surfaces 41 and 42, and to prevent the entrance of dirt and any other contaminating materials through this interface, a seal of felt or other suitable material 45 engages the outer peripheral surface 48 of the thrust flange 43 and the peripheral surface of the hub 18. The seal 45 extends for 360° about the circumference of the hub 18 and the thrust flange 43 of the bearing 10, and the seal is secured within a seal retainer 49 having a pair of inwardly bent, opposed legs 50.

Since the retainer 49 for the seal 45 is secured beneath the lip 40 of the seal ring 36, leakage of oil from the interface between the thrust surfaces 41 and 42 and moving along the annular surface 48 of the thrust bearing 43 is discharged into the ambient atmosphere. The seal ring 36 is sealed in an effective manner, such as by press-fit on the gear hub 18, so as to prevent any leakage of lubricant from the bearings into the heavy-weight lubricant within the gear housing 20.

The two seals 33 and 45 are superimposed one above another and hence do not require a large amount of lateral space in which to be located, which space is at a premium. Furthermore, it should be noted that any leakage of lubricant is discharged to the atmosphere rather than being afforded a chance to move through another seal and commingle with another lubricant to change the consistency or viscosity thereof.

For the purpose of preventing the build-up of oil pressure between the bearings 10 and the axle 11, an oil drain 60 is provided, being in the form of an aperture in the thrust flange 43 of the bearing 10R. That is to say, to prevent the build-up of oil pressure and the flooding of the seals and thereby a rendering of the seal 33 to be less effective, the opening or drain 60 permits oil at the interface to drain to the ambient atmosphere.

The bearings 10L and 10R are interchangeable, and referring now to the bearing 10L, a slot 61 is provided in the thrust flange periphery in which is carried a dust guard bracket or seal means 62 which has an inwardly turned flange 63 for holding a seal 65 in engagement with a hub 67 on the adjacent wheel 12. The dust guard 62 and seal 65 prevent the entrance of foreign material into the bearing means 10L as the hub 67 of the wheel 12 rotates with the axle 11 and likewise serves to prevent the loss of oil from the bearing means 10 at the opposite end of the axle 11.

From the foregoing, it will be apparent that by a novel construction of elements, any leakage of oil from the bearing 10R at the pinion side of the axle flows across the peripheral surface 48 of the bearing to the ambient atmosphere and that any leakage of heavy, viscous grease from the gear housing 20 moves across the outer peripheral surface 35 of the seal ring 36 to the ambient atmosphere. This is in contrast to the prior art devices wherein any leakage of a seal or the failure of the seal resulted in a commingling of the oil and grease, thereby detrimentally affecting the operation of the element whose lubricant had been changed.

Further, the seal ring 36 provides a unique means for mounting separate seals and superimposing them one above another so that two seals can be employed in a space where normally there is only enough lateral space for one seal.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

From the foregoing, it will be apparent that by a novel construction of elements, any leakage of oil from the bearing 10R at the pinion side of the axle flows across the peripheral surface 48 of the bearing to the ambient atmosphere and that any leakage of heavy, viscous grease from the gear housing 20 moves across the outer peripheral surface 35 of the seal ring 36 to the ambient atmosphere. This is in contrast to the prior art devices wherein any leakage of a seal or the failure of the seal resulted in a commingling of the oil and grease, thereby detrimentally affecting the operation of the element whose lubricant had been changed.

Further, the seal ring 36 provides a unique means for mounting separate seals and superimposing them one above another so that two seals can be employed in a space where normally there is only enough lateral space for one seal.

Hence, while I have illustrated and described the preferred embodiment of my invention, it is to be understood that this is capable of variation and modification.

I claim:

1. In a traction motor support having lubricated bearings supporting an axle for a drive gear, a gear having a hub secured on said axle, means affording a seal support seal filled on said gear hub and including a portion overlying an end portion of one of said bearings, said seal support being in communication with the ambient atmosphere, a seal means on said seal support engageable with the exterior of said one bearing for preventing leakage of lubricant for the bearing therepast and preventing the entrance of foreign material into said bearing, any leakage of said bearing lubricant past said seal going to said ambient atmosphere, a housing means for said gear protecting said gear and adapted to contain a gear lubricant therein, and a seal means on said housing means engaging the outer surface of said seal support to prevent leakage of said gear lubricant from said housing means, any leakage of said gear lubricant past said seal means on said housing means going to the ambient atmosphere.

2. In the traction motor support of claim 1 wherein said seal support includes a circular flange means secured to said gear hub, said flange means having an inner surface in which is disposed said seal means for said bearing lubricant and said flange means having an outer surface in engagement with said seal means on said gear housing, said gear housing seal means being superimposed over said bearing seal means.

3. In a traction motor support having lubricated bearings for a railway axle carrying wheels and a driving gear for said axle, a gear having a gear hub on said driving axle extending inwardly of said gear to said bearing, a flange means secured on said gear hub and having a circular flange extending over the end portion of one of said bearings, a bearing seal means secured to the radially inward side of said flange, said bearing seal means being in engagement with said gear hub and the end portion of said bearing to seal bearing lubricant within said bearing, leakage of bearing lubricant past said one bearing being to the ambient atmosphere, a gear housing surrounding said gear and containing a lubricant for said gear, and a gear seal means carried by said gear housing and in engagement with the outer surface of said flange of said flange means whereby any leakage of gear lubricant past said gear seal means flows along the top of said flange to the ambient atmosphere.

4. The support of claim 3 wherein said one bearing terminates in a radially outward flange having a thrust surface engageable with a thrust surface on said gear hub and having an outer surface in engagement with said bearing seal means.

5. In combination with a railway drive mechanism having a driving gear, the gear having a hub, lubricated by a lubricant of a first weight and having an axle journalled within bearings lubricated by a lighter-weight lubricant, a dust guard and lubricant sealing means adjacent one of the bearings for preventing the commingling of the lubricants and for discharging any leakage of either of said lubricants to the ambient atmosphere, a seal-supporting ring secured to the hub of said gear and having an annular groove therein directed inwardly over the top of said one bearing, a thrust flange on the end of said one bearing extending radially outward along said gear hub to beneath the groove in said ring, the outer surface of said thrust flange being exposed to the ambient atmosphere, a lubricant seal means disposed in said groove and disposed in engagement with the outer surface of said thrust flange of said bearing, said seal means preventing the flow of bearing lubricant over the surface of the thrust flange except through an internal aperture therein, a stationary gear housing for said gear lubricant in said railway drive mechanism, a gear lubricant sealing means secured to said gear housing and in sealing engagement with the outer surface of said ring means so that any leakage of gear lubricant past said gear lubricant sealing means moves across the outer surface of said ring to the ambient atmosphere.

References Cited by the Examiner
UNITED STATES PATENTS

| | | | |
|---|---|---|---|
| 2,161,768 | 6/1939 | Smitmans | 308—36.1 |
| 2,186,233 | 1/1940 | Bollinger | 308—36.1 |
| 2,237,921 | 4/1941 | Baker | 308—36.1 |
| 2,304,389 | 12/1942 | Young | 308—187.1 |
| 2,639,204 | 5/1953 | Terry | 308—187.1 |
| 2,714,023 | 7/1955 | Hennessy | 277—58 |
| 3,106,405 | 10/1963 | Pringle | 277—184 X |

DAVID J. WILLIAMOWSKY, *Primary Examiner.*

L. L. JOHNSON, *Assistant Examiner.*

UNITED STATES PATENT OFFICE
CERTIFICATE OF CORRECTION

Patent No. 3,281,190                      October 25, 1966

Issac E. Cox

It is hereby certified that error appears in the above numbered patent requiring correction and that the said Letters Patent should read as corrected below.

Column 4, line 46, for "filled" read -- fitted --.

Signed and sealed this 5th day of September 1967.

(SEAL)
Attest:

ERNEST W. SWIDER
Attesting Officer

EDWARD J. BRENNER
Commissioner of Patents